(12) United States Patent
Keller

(10) Patent No.: US 8,940,205 B2
(45) Date of Patent: Jan. 27, 2015

(54) PRODUCTION OF USEFUL ARTICLES FROM WASTE MATERIAL

(75) Inventor: Brian D. Keller, Oregon, WI (US)

(73) Assignee: Strandex Corporation, Madison, WI (US)

( * ) Notice: Subject to any disclaimer, the term of this patent is extended or adjusted under 35 U.S.C. 154(b) by 323 days.

(21) Appl. No.: 13/034,418

(22) Filed: Feb. 24, 2011

(65) Prior Publication Data

US 2011/0210469 A1 Sep. 1, 2011

Related U.S. Application Data

(60) Provisional application No. 61/308,387, filed on Feb. 26, 2010.

(51) Int. Cl.
| | | |
|---|---|---|
| *D01D 5/40* | (2006.01) | |
| *B29B 17/00* | (2006.01) | |
| *B29B 17/04* | (2006.01) | |
| *B29K 1/00* | (2006.01) | |
| *B29K 101/12* | (2006.01) | |
| *B29K 311/10* | (2006.01) | |
| *B29K 711/12* | (2006.01) | |
| *B29K 711/14* | (2006.01) | |
| *B29L 31/10* | (2006.01) | |
| *B29L 31/48* | (2006.01) | |

(52) U.S. Cl.
CPC ......... *B29B 17/0036* (2013.01); *B29B 17/0412* (2013.01); *B29B 2017/0476* (2013.01); *B29K 2001/00* (2013.01); *B29K 2101/12* (2013.01); *B29K 2311/10* (2013.01); *B29K 2711/12* (2013.01); *B29K 2711/14* (2013.01); *B29L 2031/10* (2013.01); *B29L 2031/4878* (2013.01)
USPC .......................................................... 264/140

(58) Field of Classification Search
USPC .......................................................... 264/140
See application file for complete search history.

(56) References Cited

U.S. PATENT DOCUMENTS

| | | | |
|---|---|---|---|
| 4,013,751 A | | 3/1977 | Davis et al. |
| 4,250,222 A | | 2/1981 | Mavel et al. |
| 4,723,509 A | * | 2/1988 | Schaefer ........................ 119/172 |
| 4,986,480 A | | 1/1991 | Gullichsen et al. |
| 5,075,057 A | | 12/1991 | Hoedl |
| 5,195,684 A | | 3/1993 | Radzins |
| 5,217,655 A | | 6/1993 | Schmidt |
| 5,435,954 A | | 7/1995 | Wold |
| 5,516,472 A | | 5/1996 | Laver |
| 5,769,335 A | | 6/1998 | Shutov |
| 5,850,977 A | | 12/1998 | Csendes |
| 6,253,527 B1 | | 7/2001 | De Zen |

(Continued)

FOREIGN PATENT DOCUMENTS

| | | |
|---|---|---|
| DE | 42 29 106 C1 | 3/1994 |
| EP | 0718081 A2 | 6/1996 |

(Continued)

*Primary Examiner* — Larry Thrower
(74) *Attorney, Agent, or Firm* — Charles S. Sara, Esq.; Daniel A. Blasiole; DeWitt Ross & Stevens S.C.

(57) ABSTRACT

Disclosed is a process of using waste material comprising absorbent material and a thermoplastic material, such as from the manufacture of disposable absorbent articles, to produce useful articles. The process includes shearing the waste material, chopping the waste material, pelleting the waste material, and extruding or injection molding the pelleted material to create a useful article.

26 Claims, 1 Drawing Sheet

(56) References Cited

U.S. PATENT DOCUMENTS

| | | |
|---|---|---|
| 6,344,504 B1 | 2/2002 | Zehner et al. |
| 6,513,737 B2 | 2/2003 | Ivanov et al. |
| 6,632,494 B1 | 10/2003 | Okubo et al. |
| 6,802,353 B2 | 10/2004 | Malakouti et al. |
| 7,022,751 B2 | 4/2006 | Zhang et al. |
| 7,186,102 B2 | 3/2007 | Laver et al. |
| 7,307,108 B2 | 12/2007 | Medoff et al. |
| 7,470,463 B2 | 12/2008 | Medoff et al. |
| 7,537,826 B2 | 5/2009 | Medoff et al. |
| 2002/0132960 A1 | 9/2002 | Haile et al. |
| 2004/0213081 A1 | 10/2004 | Wissing et al. |
| 2006/0006564 A1 | 1/2006 | Maldas et al. |
| 2007/0212531 A1 | 9/2007 | McIntyre et al. |
| 2010/0015267 A1 | 1/2010 | Keller et al. |

FOREIGN PATENT DOCUMENTS

| | | |
|---|---|---|
| EP | 0780205 A2 | 6/1997 |
| JP | 56008454 | 1/1981 |
| WO | WO 2005/044536 A2 | 5/2005 |
| WO | WO 2008/055149 A2 | 5/2008 |

* cited by examiner

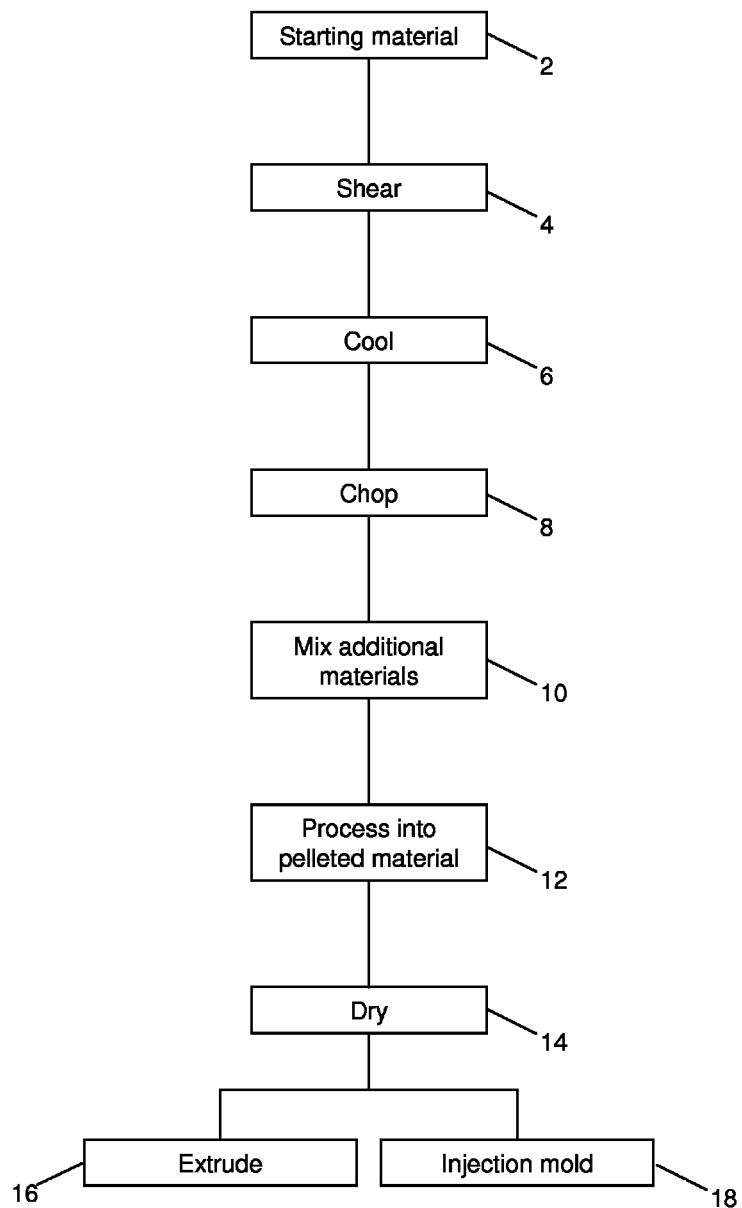

PRODUCTION OF USEFUL ARTICLES FROM WASTE MATERIAL

REFERENCE TO RELATED APPLICATION

This application claims priority Under 35 USC §119(e) to U.S. Provisional Application entitled "Production of Extruded Building Material from Waste Products," Ser. No. 61/308,387, filed Feb. 26, 2010, which is incorporated herein by reference in its entirety.

FIELD OF THE INVENTION

The present invention is directed to methods of converting waste material from the manufacture of disposable absorbent articles or other waste material into extruded composite building materials, injection molded consumer articles, or synthetic mulch.

BACKGROUND

The manufacture of disposable personal absorbent items such as diapers, absorbent pads, adult incontinence products, feminine hygiene products, etc., generates a significant amount of pre-consumer waste. Disposal of this waste is expensive due to the diminishing availability of landfill space. Incineration of the waste is undesirable, as superabsorbent polymers sometimes contained in such articles causes buildup of the polymer on the surface of the incinerator (see, e.g., U.S. Pat. No. 6,632,494 to Okubo et al.). By contrast, recycling and reuse of the waste is extremely beneficial, not only in terms of environmental benefits but also in terms of profitability for manufacturers. Because of these factors, manufacturers of disposable absorbent items are developing methods to reclaim and return as much waste as possible to the manufacturing process.

However, manufacturers face several barriers to reclaiming and reusing the waste from disposable absorbent items. One problem is that the wastes often contain a mixture of materials that are segregated in conventional manufacturing processes. For example, the waste may contain co-mingled plastics from different portions or different types of disposable articles. The co-mingled plastics may include melt-spun polypropylene, elastomeric polypropylene and polyethylene, and superabsorbent polymers, among other plastics. In addition to the co-mingled plastics, the waste can contain significant amounts of cellulosic fibers with a very low bulk density. These materials are typically segregated in manufacturing because they serve different functions.

This mixture of materials presents a challenge to reusing the waste in the manufacture of disposable absorbent items. For example, a disposable diaper typically includes a soft, porous inner liner, an absorbent layer with cellulosic fibers and superabsorbent polymers, and a moisture-resistant outer liner. The inner and outer liners cannot perform their intended functions if they are contaminated with the absorbent fibers or particles. Even when an effort is made to recycle a portion of the manufacturing waste, care is taken to prevent mixing of the recycled materials in the different portions of the manufactured article, and any mixing or contamination that occurs results in unusable absorbent articles that themselves become waste. See, e.g., U.S. Pat. No. 6,802,353 to Malakouti et al.

The mixture of materials in disposable absorbent article waste also presents challenges to reusing such waste in manufacturing other items. For example, there are several barriers to the use of the mixed waste material in the manufacture of building materials such as extruded wood plastic composites. The co-mingled plastics affect the appearance of extruded profiles made from the recycled material if the various components are not adequately and uniformly dispersed in the finished article. In addition, the cellulosic fibers are difficult to disperse in the thermoplastic, which results in clumps of fibers that are not incorporated into the thermoplastic matrix. These clumps provide areas where moisture can infiltrate the material and weaken the material. The clumps also weaken the material by resulting in discontinuities in the matrix.

Conversion of the waste into building products or consumer articles is also made difficult by the presence of superabsorbent polymers sometimes contained in such waste. The superabsorbent polymer particles absorb much more water than natural fibers. As a result, moisture is captured by the waste from ambient air. This moisture becomes a contaminant in the manufacturing process. The steam produced from this moisture during manufacturing creates voids in the interior and bubbles on the surface of extruded materials and interferes with mold-filling during the injection molding processes. The superabsorbent polymer particles attract moisture both before and after processing.

If the above barriers can be overcome, the waste from disposable absorbent articles represents a potential source of recycled fiber and thermoplastic for the manufacture of various materials, including extruded decking and siding, articles commonly made by injection molding, or processed materials such as artificial mulch. Processing these materials into usable articles requires a method of processing the waste that densifies the waste so that it can be handled, disperses the fibers and co-mingled plastics uniformly, and produces an appearance that will be acceptable to the consumer. Development of a method for processing these wastes into useful articles will benefit both the manufacturers of the disposable articles (by eliminating the cost of disposal) and the manufacturers of building materials and injection molded articles (by providing a low-cost raw material).

Various methods have attempted to recycle post-consumer waste. See, e.g., WO 2008/055149 to Reaveley and Bryant; U.S. Patent Application 2006/0006564 to Maldas et al.; and U.S. Patent Application Publication 2007/0212531 to McIntyre et al. However, these methods fail to generate articles with suitable structural integrity as a result of lacking provisions to disperse the mixed materials present in waste. Consequently, there is currently no method available for the conversion of absorbent article waste into feedstock for generating decorative or structural composites through extrusion, injection molding, or other methods.

SUMMARY OF THE INVENTION

The present invention is capable of producing the degree of dispersion necessary for producing articles from absorbent article waste material. The resulting material produced by the present methods can be used in many manufacturing procedures, including extrusion and injection molding.

One version of the present invention includes a method of using waste material comprising an absorbent material and a thermoplastic material in the production of a useful article. The method includes shearing the waste material to generate sheared material, wherein the waste material is homogenized and densified; chopping the sheared material to generate chopped material, wherein the chopped material has reduced particle size and increased density with respect to the sheared material; combining and mixing the chopped material with one or more other materials to form a mixed material; and processing the mixed material to form pelleted material.

The waste material preferably comprises material from disposable absorbent articles. In some versions, the waste material comprises a superabsorbent polymer. The superabsorbent polymer may be selected from the group consisting of sodium acrylates, polyacrylate-containing polymers or copolymers, polyacrylamide-containing polymers or copolymers, ethylene- and maleic anhydride-containing copolymers, cross-linked carboxymethylcellulose, polyvinyl alcohol-containing polymers or copolymers, cross-linked polyethylene oxide, and starch-grafted polymers or copolymers of polyacrylonitrile. The waste material may comprise material from the manufacture of articles selected from the group consisting of diapers, absorbent pads, adult incontinence products, and feminine hygiene products.

The shearing preferably comprises maintaining temperature of the waste material below the melting point of a plastic in the waste material. In some versions of the invention, the sheared waste material is maintained at about 5° F. to about 10° F. below the average melting point of plastic in the waste material. The shearing may comprise introducing the waste material between stationary and rotating chilled discs. The temperature may be controlled by adjusting a gap between the stationary disc and the rotating disc. In some versions of the invention, maintaining the temperature of the waste material below the melting point of the plastic is performed by monitoring the strands of sheared material that emerge from the discs, wherein strands that separate in pieces approximately 2 inches in length indicate a temperature below the melting point of the plastic.

The sheared material may be cooled prior to chopping the sheared material.

Chopping the sheared material preferably results in particles of chopped material of from about 0.125 inches to about 0.5 inches in size.

The other materials added to the chopped material in the combining and mixing step may comprise a cellulosic fiber, a thermoplastic resin, a lubricant, a mineral filler, a process aid, a pigment, and a thermosetting resin. In some versions of the invention, the combining and mixing results in a mixed material comprising: about 30% to about 75% w/w cellulosic fiber; about 20% to about 70% w/w thermoplastic resin; and about 3% to about 25% w/w of an ingredient selected from the group consisting of a lubricant, a mineral filler, a process aid, a pigment, and a thermosetting resin. The combined materials are preferably mixed in a low-speed mixing device, such as a ribbon blender.

Processing the mixed material to form pelleted material preferably comprises processing the mixed material in a pellet mill. The processing may generate a friable pellet.

In some versions of the invention, the pelleted material is extruded. It is preferred that moisture is removed from the pelleted material by drying prior to extrusion. The drying is preferably performed by forcing air at a temperature of about 180° F. to about 200° F. through a mass of the pelleted material. The extruded materials may be co-extruded with a capstock.

In other versions of the invention, the pelleted material or other materials obtained by any of the steps described herein are used as feedstock in injection molding.

In yet other versions, the pelleted material or other materials obtained by any of the steps described herein are used as synthetic mulch or processed to form synthetic mulch.

The methods described herein advantageously use waste material that would otherwise be disposed in a landfill or incinerated. A specific advantage of the synthetic mulch resulting from the methods described herein is that it retains a superior appearance for a longer time than painted or dyed synthetic mulch due to the dispersal of the color pigment within the material. Furthermore, the synthetic mulch can be recycled and further used in extrusion or injection molding according to the methods described herein when removed from the landscape.

The objects and advantages of the invention will appear more fully from the following detailed description of the preferred embodiment of the invention made in conjunction with the accompanying drawings.

BRIEF DESCRIPTION OF THE DRAWING

The sole drawing depicts a preferred version of the present invention, wherein starting materials 2 such as disposable absorbent article materials are sheared 2, cooled 6, chopped 8, mixed 10 with further ingredients, processed into pelleted material 12, dried 14, and then extruded 16 or injection molded 18. Suitable modifications of the depicted method include a re-ordering of the depicted steps, removal of the depicted steps, and/or addition of further steps to those shown. For example, material resulting from the chopping 8 step may be used directly as synthetic mulch or for generating useful articles by injection molding 18. Similarly, the pelleted 12 material may also be used directly as synthetic mulch or for generating useful articles by injection molding 18. Various non-limiting examples of modifications of the method depicted in the sole drawing are described herein. The reference numerals shown in the sole drawing are used throughout the following description.

DETAILED DESCRIPTION OF THE INVENTION

The present methods are directed to processes for using waste from disposable absorbent articles containing cellulosic fiber and thermoplastics in a manner that densifies the waste material, disperses the fibers, and co-mingles the plastics. A specific version of the present methods uses waste from the manufacture of such articles. In some versions, the present methods produce extruded 16 building materials without weak spots. In other versions, the present methods produce articles commonly made by an injection molding 18 process. In yet other versions, the present methods produce improved synthetic mulch.

Suitable starting material 2 for the methods described herein includes any waste comprising an absorbent material, a thermoplastic material, or a mixture thereof.

As used herein, "absorbent material" refers to any material containing or capable of absorbing an amount of an aqueous liquid having a weight at least 10-times the dry weight of the material. Non-limiting examples include cellulosic material and absorbent polymers such as superabsorbent polymers (SAPs).

Virtually any cellulose-based material can be used in the present methods. Examples of suitable cellulosic material include old newspapers, pond sludge, sawdust, alfalfa, wheat pulp, wood chips, wood particles, wood flour, wood flakes, wood fibers, ground wood, wood veneers, wood laminates, kenaf, paper, tissue paper, sponge, fluff pulp, cardboard, straw, and other cellulosic fibrous materials or pulps. The cellulosic fibrous material may also comprise refined cellulose such as cotton or viscous and plant fibers such as kenaf, bamboo or palm fiber, straw or any other cellulosic fibrous material.

SAPs, also called slush powders, are polymers that can absorb and retain extremely large amounts of a liquid relative to their own mass. A SAP may absorb an amount of liquid comprising from 50 to 500 times the SAP's weight. This contrasts with cellulosic or fiber-based products, which typically absorb only up to about 20 times their weight. The ability and propensity to absorb such large amounts of liquid makes processing articles comprising SAPs using conventional methods particularly difficult. SAPs are often used in personal disposable hygiene products, baby diapers, adult protective underwear, or sanitary napkins. Examples of SAPs that can be processed in the current invention include but are not limited to sodium acrylates, polyacrylate-containing polymers or copolymers, polyacrylamide-containing polymers or copolymers, ethylene- and maleic anhydride-containing copolymers, cross-linked carboxymethylcellulose, polyvinyl alcohol-containing polymers or copolymers, cross-linked polyethylene oxide, and starch-grafted polymers or copolymers of polyacrylonitrile (e.g., "Super Slurper").

Any type of thermoplastic material may be included in the starting material 2. Examples include multi-layer films; thermoplastics such as polyethylene, polypropylene, poly-vinyl chloride (PVC), low density polyethylene (LDPE), and copoly-ethylene-vinyl acetate; waste plastic sawdust; melt-spun polymers; elastomeric polymers; and other recyclable polymer materials.

A preferred starting material 2 includes disposable absorbent articles and waste associated therewith, including pre-consumer disposable absorbent articles, pre-consumer waste from the manufacture of disposable absorbent articles, post-consumer disposable absorbent articles, and mixtures thereof. While both pre-consumer and post-consumer disposable absorbent article waste can be used, the methods described herein are particularly useful for pre-consumer waste, such as waste from manufacturing of disposable absorbent articles and plant recycling. Disposable absorbent articles have conventionally been difficult to use in follow-up recycling or manufacturing procedures because of the variety of polymers and the presence of bulky absorbent fibers in them.

A "disposable absorbent article" refers herein to a device that normally absorbs and retains fluids. In certain instances, the phrase refers herein to devices that are placed against or in proximity to the body of the wearer to absorb and contain the excreta and/or exudates discharged from the body, and includes such personal care articles as baby diapers, baby training pants, adult incontinence articles, feminine hygiene articles, baby swim diapers, wound dressing, absorbent pads, and the like. In other instances, the phrase refers herein to protective articles, such as, for example, dining bibs that have the ability to absorb food items to prevent staining of the wearer's clothing. In still other instances, the phrase refers herein to devices that can retain a benefit component—such as a lotion, shampoo, soap, polishing material or cleansing material—until such time when the article is utilized by a consumer for its intended purpose. Such devices can include wash cloths, body wipes, body wraps, pet grooming articles, cleaning and polishing articles, and the like. The term "disposable" is used herein to describe products which generally are not intended to be laundered or otherwise restored or extensively re-used in their original function, i.e., preferably they are intended to be discarded after about 10 uses or after about 5 uses or after about a single use. The term "diaper" refers herein to disposable absorbent articles generally worn by infants and other incontinent persons about the lower torso, and includes baby diapers, baby training pants, baby pool diapers, adult incontinence articles, and the like. The term "feminine hygiene articles" refers herein to any absorbent article worn by women to absorb and contain menses and other vaginal exudates. A "body wrap" refers herein to an article or a garment worn about the body, typically to provide some therapeutic benefit, such as, for example, pain relief, wound coverage, or to hold another device or article near the body. Disposable absorbent articles typically contain polypropylene liners, absorbent materials, and various elastomers or other elastic materials. The term "elastic" refers herein to any material that upon application of a force to its initial, relaxed, length can stretch or elongate to its elongated length without rupture and breakage, and which can substantially recover its initial length upon release of the applied force. All of these materials can be accommodated by the methods described herein.

A preferred first step in the present methods comprises shearing 4 the starting material 2 to homogenize and densify the material. The shearing 4 is preferably performed using a shearing device comprising stationary and rotating chilled discs. In a preferred shearing device, the rotating disc is conical and has an opening in the center for the introduction of material. The stationary disc is concave so as to accept the conical shape of the rotating disc. The rotating and stationary discs are positioned in a nested configuration and form an adjustable gap therebetween. Starting material 2 is fed into the gap between the discs by an auger that pushes the material through the opening in the center of the rotating disc. This machine is known as a disc agglomerator or as a condux. An example of a preferred shearing device which can be used in the methods described herein is the "CONDUX"-brand Universal Mill (Netzsch-Condux Mahitechnik GmbH, Hanau, Germany).

Shearing 4 material comprising both absorbent materials and plastics presents unique challenges. Absorbent materials such as cellulosic material and SAP particles are hydrophilic and are not compatible with the hydrophobic plastics. The absorbent materials are attracted to each other and are repelled by the non-polar plastics. To promote even co-distribution of these materials and to avoid their segregation, the processing temperature must be maintained in a narrow range in which the plastics are softened but do not become molten, free flowing fluids. A suitable temperature is between about 1° F. (about 0.6° C.) and about 15° F. (about 8° C.) below the average melting point of the plastics in the mixture, and more preferably, between about 5° F. (about 3° C.) and about 10° F. (about 6° C.) below the average melting point of the plastics in the mixture. At these temperatures, the plastics are softened but do not flow. Softening of the plastics promotes mechanical dispersion of the cellulosic fiber and SAP particles within the plastic matrix. By contrast, melting the plastics into a free flowing fluid promotes deleterious segregation of the cellulosic fiber and SAP particles from the plastics.

One method of maintaining this narrow processing temperature range during shearing 4 is as follows. The discs are cooled using water cooled to a temperature of about 55° F. (about 13° C.) to about 65° F. (about 18° C.). Starting material 2 is introduced at ambient temperature into the shearing device. The shearing 4 and kneading of the material between the discs causes the temperature of the material to rise. The material is rolled into numerous wormlike strands, which emerge from between the discs at the periphery. As the material is rolled, the cellulosic fibers and SAP particles are dispersed in the softened plastic. The increase in temperature is controlled by adjusting the gap between the discs and the rate at which material is fed into the gap. An experienced operator can determine if the temperature of the material is correct (i.e., between about 5° F. (about 3° C.) and about 10° F. (about 6° C.) below the average melting point of the plastics in the mixture) by observing strand formation. When the portion of the strand that has emerged from the discs reaches about 1 inch (about 2.5 cm) to about 3 inches (about 7.6 cm) in length, such as about 2 inches (about 5.1 cm) in length, centrifugal force will cause it to break loose.

After shearing 4 the material, the material is preferably cooled 6 prior to undergoing further processing steps. This helps to prevent melting of the material during further processing. Cooling 6 of the material to room temperature is preferred. One method of cooling 6 includes air cooling the sheared 4 material as it is pneumatically conveyed to the next processing device. Other methods of cooling 6 are acceptable.

After shearing 4 and the optional cooling 6, the material may then be chopped 8 into particles. This may be performed by conveying the strands of material to a grinder. A preferred grinder is fitted with stationary and rotating blades. Material exiting the grinder may pass through a screen that determines the final size of the particles. Particle size preferably ranges from about 0.125 inches (about 0.3 cm) to about 0.5 inches (about 1.3 cm). Other particle sizes may be acceptable for particular purposes. The chopping 8 step increases the bulk density of the material and breaks down and disperses any clumps of absorbent material.

Starting material 2 that has been sheared 4 and chopped 8 is described herein as "densified material." The densified material may be used directly in the production of a low-cost synthetic mulch suitable for use as a landscaping material. Alternatively, the densified material may be used directly as a feedstock for injection molding 18.

For other applications, the densified material may then be combined and mixed 10 with any number of additional materials required for generating other particular end products. The additional materials may be non-recycled material or recycled material. Such additional materials include but are not limited to cellulosic fibers, thermoplastic resins, lubricants, mineral fillers, process aids, pigments, and/or thermosetting resins. The combining and mixing 10 step may be performed by conveying the densified material to a low-speed mixing device, such as a ribbon blender, where the additional material or materials are added and mixed 10. The materials in the mixing device are preferably blended for approximately two minutes or until evenly dispersed. The step of combining and mixing 10 results in mixed material.

The type or types of additional materials that are added to the densified material depends on the desired end product. For example, if the desired end product is synthetic mulch, a color pigment, among other ingredients, is preferably added.

In a preferred version of the invention, the desired end product is a wood-plastic composite suitable for use as a building material, such as substitute wood planks, deck boards, etc. For the purposes of this disclosure, "wood-plastic composite" refers to any composite material composed of cellulosic fiber and thermoplastic. For generating wood-plastic composite, the densified material may be combined and mixed 10 with other ingredients in a wood-plastic composite formulation designed for extrusion 16. One preferred version of such a formulation contains about 30% to 75% cellulosic fiber, about 20% to 70% thermoplastic resin, and about 3% to 25% other ingredients, wherein the other ingredients may include lubricants, mineral fillers, process aids, pigments, and cross-linking agents. For example, the formulation may contain about 30%, 35%, 40%, 45%, 50%, 55%, 60%, 65%, 70%, or 75% cellulosic fiber; about 20%, 25%, 30%, 35%, 40%, 45%, 50%, 55%, 60%, 65%, or 70% thermoplastic resin; and about 3%, 5%, 10%, 15%, 20%, or 25% other ingredients.

The percent cellulosic fiber and thermoplastic in the densified material can be estimated by the percentages of these materials in the starting material 2, and the additional cellulosic fiber, thermoplastic resin, and/or other ingredients can then be added to reach the above proportions in the final product. Alternatively, the densified waste material may be substituted for all or part of the thermoplastic resin in the above-described, preferred wood-plastic composite formulation or other formulations described herein.

While the above-described formulation is preferred for extrusion 16 of wood-plastic composites, formulations with other proportions and/or other ingredients are acceptable. A wide range of proportions of cellulosic fiber to thermoplastic content can be used by employing a continuous low temperature extrusion 16 process as described in U.S. Pat. No. 5,516,472 to Layer, which is incorporated by reference in its entirety. Accordingly, the proportion of cellulosic fibers to the thermoplastic material may be between a ratio of about 4:1 and a ratio approximating 1:0 (about 99:1). A proportion of the cellulosic fibers to the thermoplastic material of about 1:1 is also suitable. Lubricants, mineral fillers, process aids, pigments, cross-linking agents, and/or any other ingredients can be added in a proportion suitable for the particular end product.

Virtually any kind of cellulosic material can comprise the cellulosic fibrous material of the wood-plastic composite formulation. Suitable cellulosic materials include those described above for the starting material 2. Prior to being combined with the densified material, the cellulosic materials may be dried to a moisture content between about 1% and about 9%, such as about 2%. Drying technologies are known in the art. A suitable example is a desiccant dryer manufactured by Premier Pneumatics, Inc. (Allentown, Pa.). However, drying the cellulosic material is not necessary provided that materials made from the mixed material, such as pelleted 12 material, is dried 14. Thus, some versions of the invention include adding non-dried cellulosic fiber to the densified material in the combining and mixing 10 step.

The thermoplastic material in the wood-plastic composite formulation serves primarily as a process fluidizer. Suitable thermoplastic materials include those described above for the starting material 2. Although adding additional thermoplastic materials to the densified material is preferred, it is not required, provided that the densified material includes at least a small proportion of thermoplastics (i.e., ~1%) or that sufficient cross-linking agents and lubricants are added to "plasticize" the mixture in the extruder.

The cross-linking agent serves to strengthen the bond between the several strands of the cellulosic fibers into a final homogenous product. The cross-linking agent bonds across the pendent hydroxy groups on the cellulose molecular chain. Cross-linking agents must have the characteristics of forming a strong bond at relatively low temperatures. Examples of cross-linking agents include polyurethanes such as isocyanate, phenolic resins, unsaturated polyesters and epoxy resins, and combinations of the same. The phenolic resins may be any single stage or two stage resin, preferably with a low hexane content. Although a cross-linking agent may be added to strengthen the bonds between the cellulosic fiber strands, the cross-linking agent is not required to form the final product as long as thermoplastic materials are included in the starting material 2. In the preferred formulation, the cross-linking agent is a phenolic resin.

Lubricants, which are common commercial lubricants known to the art of plastic processing, behave as processing aids. Examples of typical lubricants include zinc stearate, which is an internal lubricant, and paraffin-type wax, which is an exterior lubricant. There are many formulation recipes which can be prepared.

The following table includes four examples of suitable formulations for a wood-plastic composite (expressed in pounds of material), wherein the densified material may be substituted for some or all of the thermoplastic resin:

| RECIPE | I | II | III | IV |
|---|---|---|---|---|
| Wood Flour | 25.00 | 25.00 | 25.00 | 25.00 |
| Thermoplastic resin | 15.00 | 12.50 | 15.00 | 7.50 |
| Zinc Stearate | .75 | 1.50 | 1.00 | 1.25 |
| Wax | .50 | .50 | .50 | .75 |
| Phenolic Resin | 1.50 | .00 | .00 | 8.50 |
| Isocyanate | .50 | 1.00 | .00 | .00 |
| Epoxy Resin | .00 | .00 | 2.50 | .00 |
| Catalyst | .00 | .00 | .075 | .00 |

Another formulation is as follows:

| MATERIAL | AMOUNT (PARTS) |
|---|---|
| Wood Flour (40 Mesh) | 100.0 |
| Thermoplastic Resin | 0.0 to 20.0 |
| Densified Material | 20.0 to 40.0 |
| Zinc Stearate | 3.0 |
| External Wax | 2.0 |
| Phenolic Resin | 6.0 |

In some versions of the invention, the mixed 10 material is used as feedstock for injection molding 18 or extrusion 16. If used in extrusion 16, it is preferred, but not required, that the mixed 10 material is first dried 14 using any of the techniques described herein or known in the art.

The mixed 10 material is preferably pelleted 12, i.e., processed to form pelleted material (pellets) 12. The pellets preferably comprise polymer, fiber, and processing aids. The pelleting 12 can be performed in a pellet mill comprising a rotating die with stationary rollers. An example of such a pellet mill is a California Pellet Mill manufactured by California Pellet Mill Co. (Crawfordsville, Ind.). This step 12 is preferably performed in a manner that melts at least a portion of the polymers present in the mixed 10 material stream. This melting further disperses the constituents of the waste, and forms a friable pellet comprising polymer, fiber, and any processing aids present in the formulation.

The pelleted 12 material may be used directly as synthetic mulch. It is preferred that pellets generated as synthetic mulch have dispersed color pigment and encapsulated fibers. The encapsulation prevents absorption of moisture. Alternatively, the pelleted 12 material may be used as a feedstock for injection molding 18.

In other versions of the invention, the pelleted 12 material preferably dried 14. Drying 14 is particularly preferred in applications for generating wood-plastic composites through extrusion 16. Drying 14 can be performed by conveying the pelleted 12 material to a drying bin where air heated to a temperature between about 150° F. (about 65.5° C.) and about 230° F. (about 110° C.), and more preferably between about 180° F. (about 82° C.) and about 200° F. (about 93° C.), is forced through the mass of pelleted 12 material to remove moisture present in the added cellulosic fiber and the densified waste. An example of such a drying bin is a Conair CH Series drying hopper with an HTC temperature controller (Conair Group, Inc., Cranberry Township, Pa.).

After drying 14, the pelleted 12 material may be used as a feedstock in generating a useful article by extrusion 16 or by injection molding 18.

Various methods of injection molding 18 are known in the art. In one version, injection molding 18 is accomplished with injection molding machines. A suitable injection molding machine includes a hopper, an injection barrel, and a mold. The hopper holds the feedstock and delivers it to the injection barrel. The injection barrel includes a means for generating heat to melt the feedstock. The injection barrel also includes a structure, such as a reciprocating screw or a ram injector, for moving the melted feedstock to the mold. The mold receives the plastic and shapes it appropriately. In injection molding 16, the feedstock is fed to the machine through the hopper. The feedstock typically enters the injection barrel by gravity through a feed throat. Upon entrance into the barrel, the resin is heated to the appropriate melting temperature. The melted feedstock is then injected into the mold by the reciprocating screw or the ram injector. The reciprocating screw offers the advantage of being able to inject a smaller percentage of the total shot (amount of melted feedstock in the barrel). The ram injector must typically inject at least 20% of the total shot while a screw injector can inject as little as 5% of the total shot. Thus, the screw injector is better suited for producing smaller parts such as synthetic mulch pieces. The mold receives the plastic and shapes it appropriately. The mold is cooled to a temperature that allows the resin to solidify and be cool to the touch. The mold plates are preferably held together by hydraulic or mechanical force. Molds are typically oversized depending on the thermoplastic constituents of the feedstock used. Each resin has a calculated shrinkage value associated with it.

The term "extrude" 16 or "extruding" 16 refers herein to a process by which a heated feedstock is forced through one or more orifices or slots of a die to form a molten stream. The pelleted 12 material can be extruded using any extrusion system. It is preferred that extrusion 16 of the pelleted 12 material is performed in a system that maintains thorough mixing and dispersion of the constituents of the pellet feedstock. An example of a suitable extrusion 16 system is described in U.S. Patent Publication 2010/0015267 to Keller et al., the disclosure of which is incorporated herein in its entirety by reference. The dies and methods described in Keller et al. are capable of producing extrusion 16 conditions that adequately disperse the various components of the waste within the wood-polymer composite matrix.

A capstock may be co-extruded 16 with the mixed 10, dried 14, pelleted 12 material in producing the useful article. Although the articles produced by the methods described herein are structurally sound, inclusion of the dispersed materials derived from the starting material 2 can result in deterioration of the appearance of the articles as they weather. A capstock co-extruded 16 on the outer surface of the article enhances their appearance. The capstock can also provide a more durable, mar-resistant surface. Methods of co-extruding capstocks are disclosed in U.S. Patent Publication 2010/0015267 to Keller et al.

Non-limiting examples of useful materials include wood-polymer composites, other types of building materials, other structural articles, or decorative articles such as synthetic mulch. The synthetic mulch may be produced by extruding 16 the friable pellets into profiles that can be processed to resemble wood chips or bark chips or by injection molding 18.

The elements and method steps described herein can be used in any combination whether explicitly described or not. All combinations of method steps as described herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

The methods and compositions of the present invention can comprise, consist of, or consist essentially of the essential elements and limitations described herein, as well as any additional or optional steps, ingredients, components, or limitations described herein or otherwise useful in the art.

Preferred versions of the invention have been described above in order to illustrate how to make and use the invention. The invention is not intended to be limited to these versions, but rather is intended to be limited only by the claims set out below. Thus, the invention encompasses all different versions that fall literally or equivalently within the scope of these claims.

I claim:

1. A method of using waste material comprising an absorbent material and a thermoplastic material in the production of a useful article comprising:
    obtaining a pelleted material, wherein the pelleted material is made from a process comprising:
        shearing the waste material to generate sheared material, wherein the waste material is homogenized and densified;
        chopping the sheared material to generate chopped material, wherein the chopped material has reduced particle size and increased density with respect to the sheared material;
        combining and mixing the chopped material with one or more other materials to form a mixed material; and
        processing the mixed material to form the pelleted material; and
    extruding or injection molding the pelleted material.

2. The method of claim 1 wherein the waste material comprises material from disposable absorbent articles.

3. The method of claim 1 wherein the waste material comprises a superabsorbent polymer.

4. The method of claim 3 wherein the superabsorbent polymer is selected from the group consisting of sodium acrylates, polyacrylate-containing polymers or copolymers, polyacrylamide-containing polymers or copolymers, ethylene- and maleic anhydride-containing copolymers, cross-linked carboxymethylcellulose, polyvinyl alcohol-containing polymers or copolymers, cross-linked polyethylene oxide, and starch-grafted polymers or copolymers of polyacrylonitrile.

5. The method of claim 1 wherein the waste material comprises waste material from manufacture of articles selected from the group consisting of diapers, absorbent pads, adult incontinence products, and feminine hygiene products.

6. The method of claim 1 wherein the shearing comprises maintaining temperature of the waste material below an average melting point of plastic in the waste material.

7. The method of claim 1 wherein the shearing comprises maintaining temperature of the waste material at about 5° F. to about 10° F. below an average melting point of plastic in the waste material.

8. The method of claim 1 wherein the shearing comprises introducing the waste material between stationary and rotating chilled discs.

9. The method of claim 8 further comprising maintaining temperature of the waste material below an average melting point of plastic in the waste material, wherein the temperature is controlled by adjusting a gap between the stationary disc and the rotating disc.

10. The method of claim 9 wherein the maintaining the temperature of the waste material below the average melting point of the plastic is indicated by strands of sheared material emerging from the discs that separate in pieces approximately 2 inches in length.

11. The method of claim 1 further comprising, prior to the chopping the sheared material, cooling the sheared material.

12. The method of claim 1 comprising chopping the sheared material to generate particles of chopped material of from about 0.125 inches to about 0.5 inches in size.

13. The method of claim 1 wherein the combining and mixing results in a mixed material comprising:
    30% to 75% w/w cellulosic fiber;
    20% to 70% w/w thermoplastic resin; and
    3% to 25% w/w an ingredient selected from the group consisting of a lubricant, a mineral filler, a process aid, a pigment, and a thermosetting resin.

14. The method of claim 1 wherein the one or more other materials is selected from the group consisting of a cellulosic fiber, a thermoplastic resin, a lubricant, a mineral filler, a process aid, a pigment, and a thermosetting resin.

15. The method of claim 1 wherein the combining and mixing comprises mixing combined materials in a mixing device.

16. The method of claim 15 wherein the mixing device is a ribbon blender.

17. The method of claim 1 wherein the processing the mixed material to form pelleted material comprises processing the mixed material in a pellet mill.

18. The method of claim 1 wherein the processing generates a friable pellet.

19. The method of claim 1 comprising extruding the pelleted material.

20. The method of claim 19 further comprising, between the processing the mixed material to form the pelleted material and extruding the pelleted material, removing moisture from the pelleted material.

21. The method of claim 20 wherein the removing the moisture from the pelleted material comprises forcing air at a temperature between about 180° F. and about 200° F. through a mass of the pelleted material.

22. The method of claim 19 further comprising co-extruding a capstock with the extruded pelleted material.

23. The method of claim 1 wherein the one or more other materials comprises a material selected from the group consisting of a thermosetting resin and a cross-linking agent.

24. A method of using waste material comprising an absorbent material and a thermoplastic material in the production of a useful article comprising:
    obtaining a pelleted material, wherein the pelleted material is made from a process comprising:
        shearing the waste material to generate sheared material, wherein the waste material is homogenized and densified;

chopping the sheared material to generate chopped material, wherein the chopped material has reduced particle size and increased density with respect to the sheared material;

combining and mixing the chopped material with one or more other materials to form a mixed material; and processing the mixed material to form the pelleted material, wherein the processing melts at least a portion of the thermoplastic material to encapsulate the absorbent material and thereby prevent absorption of moisture; and extruding or injection molding the pelleted material.

25. A method of using waste material comprising an absorbent material and a thermoplastic material in the production of a useful article comprising:

shearing the waste material to generate sheared material, wherein the waste material is homogenized and densified;

chopping the sheared material to generate chopped material, wherein the chopped material has reduced particle size and increased density with respect to the sheared material;

combining and mixing the chopped material with one or more other materials to form a mixed material;

processing the mixed material to form pelleted material; and extruding or injection molding the pelleted material.

26. The method of claim 1 comprising injection molding the pelleted material.

* * * * *